(12) United States Patent
Schmehl et al.

(10) Patent No.: US 12,520,866 B2
(45) Date of Patent: Jan. 13, 2026

(54) COFFEE ROASTING SYSTEM WITH ROASTING AND COOLING SUBSYSTEMS, AND METHODS FOR THE SAME

(71) Applicant: Bellwether Coffee Co., Berkeley, CA (US)

(72) Inventors: Peter Schmehl, Berkeley, CA (US); Stewart Schmehl, Pinehurst, NC (US)

(73) Assignee: Bellwether Coffee Co., Berkeley, CA (US)

( * ) Notice: Subject to any disclaimer, the term of this patent is extended or adjusted under 35 U.S.C. 154(b) by 984 days.

(21) Appl. No.: 17/482,862

(22) Filed: Sep. 23, 2021

(65) Prior Publication Data
US 2023/0090413 A1    Mar. 23, 2023

(51) Int. Cl.
*A23N 12/12* (2006.01)
*A23N 12/08* (2006.01)

(52) U.S. Cl.
CPC ......... *A23N 12/125* (2013.01); *A23N 12/083* (2013.01)

(58) Field of Classification Search
None
See application file for complete search history.

(56) References Cited

U.S. PATENT DOCUMENTS

| | | |
|---|---|---|
| 2,089,663 A | 8/1937 | Richeson |
| 3,595,668 A | 7/1971 | Nutting et al. |
| 4,642,906 A * | 2/1987 | Kaatze .............. A23N 12/08 34/168 |
| 4,875,904 A | 10/1989 | Munk |
| 7,285,300 B1 * | 10/2007 | Allington ............ A23N 12/08 426/523 |
| 11,510,432 B2 | 11/2022 | Sandhu et al. |
| 2006/0283337 A1 | 12/2006 | Kato |
| 2013/0344207 A1 | 12/2013 | Ludwig |
| 2018/0295870 A1 | 10/2018 | Lopez et al. |
| 2019/0208798 A1 | 7/2019 | Voges et al. |
| 2019/0320702 A1 | 10/2019 | Sandhu et al. |
| 2019/0320703 A1 | 10/2019 | Sandhu et al. |
| 2019/0350247 A1 | 11/2019 | Lopez et al. |

(Continued)

FOREIGN PATENT DOCUMENTS

WO    WO-2023014698 A1    2/2023

OTHER PUBLICATIONS

International Search Report and Written Opinion for Application No. PCT/US2022/039144, mailed on Nov. 28, 2022, 34 pages.

*Primary Examiner* — Elizabeth M Kerr
(74) *Attorney, Agent, or Firm* — COOLEY LLP

(57) ABSTRACT

A bean roasting system includes a roasting drum, an air handling system, a bean cooler, and an air exit subsystem. The air exit subsystem is configured to receive and treat a first fluid stream from the air handling system and a second fluid stream from the bean cooler. The air exit subsystem includes a heat sink and a filter. The heat sink defines two parallel fluid paths including a first fluid path and a second fluid path. The air exit subsystem includes a metal body configured to receive heat from the first fluid path and the second fluid path. The first fluid path is fluidically coupled to receive the first fluid stream from the air handling system. The second fluid path is fluidically coupled to receive the second fluid stream from the bean cooler. The filter is fluidically coupled to the first and second air flow paths.

20 Claims, 9 Drawing Sheets

(56) References Cited

U.S. PATENT DOCUMENTS

| | | |
|---|---|---|
| 2019/0373940 A1 | 12/2019 | Voges et al. |
| 2020/0288765 A1 | 9/2020 | Lopez et al. |
| 2021/0227871 A1 | 7/2021 | Sandhu et al. |
| 2021/0386108 A1 | 12/2021 | Lopez et al. |

* cited by examiner

COFFEE ROASTING SYSTEM WITH ROASTING AND COOLING SUBSYSTEMS, AND METHODS FOR THE SAME

CROSS-REFERENCE TO RELATED APPLICATIONS

The present application is related to U.S. patent application Ser. No. 17/391,579 entitled "Coffee Roasting System with Roasting and Cooling Subsystems, and Methods for the Same" and filed on Aug. 2, 2021; U.S. patent application Ser. No. 17/391,581 entitled "Coffee Roasting System with Roasting and Cooling Subsystems, and Methods for the Same" and filed on Aug. 2, 2021; and U.S. patent application Ser. No. 17/482,858 entitled "Coffee Roasting System with Roasting and Cooling Subsystems" and filed on Sep. 23, 2021; the contents of each of which is incorporated by reference in their entireties.

FIELD OF THE DISCLOSURE

The present disclosure pertains to the roasting of food products, for example beans such as coffee beans. In one or more embodiments, the present disclosure describes a roasting system having an improved system for removing heat, moisture, and effluents from exhausted fluid streams.

BACKGROUND

Food roasting machines are in wide use. One particularly common roasting machine is utilized to prepare coffee beans to be either packaged or ground and brewed. A typical roasting machine includes a roasting chamber for supporting, agitating, and roasting beans. A bean cooler is used to cool the beans after they are roasted. The roasting process occurs at high temperatures. During this process, water vapor, particulates, and noxious gases can be produced and are carried by a fluid stream that passes through the roasting chamber and out of the bean cooler. Part of the fluid stream needs to be exhausted. There is a need to efficiently treat the exhausted fluid stream.

BRIEF DESCRIPTION OF THE FIGURES

FIG. 1 illustrates connections between elements that are either fluidic connections or concern a physical transfer of a batch of beans.

FIG. 2 illustrates electrical or wireless connections between elements including a controller.

SUMMARY

Figure 1:
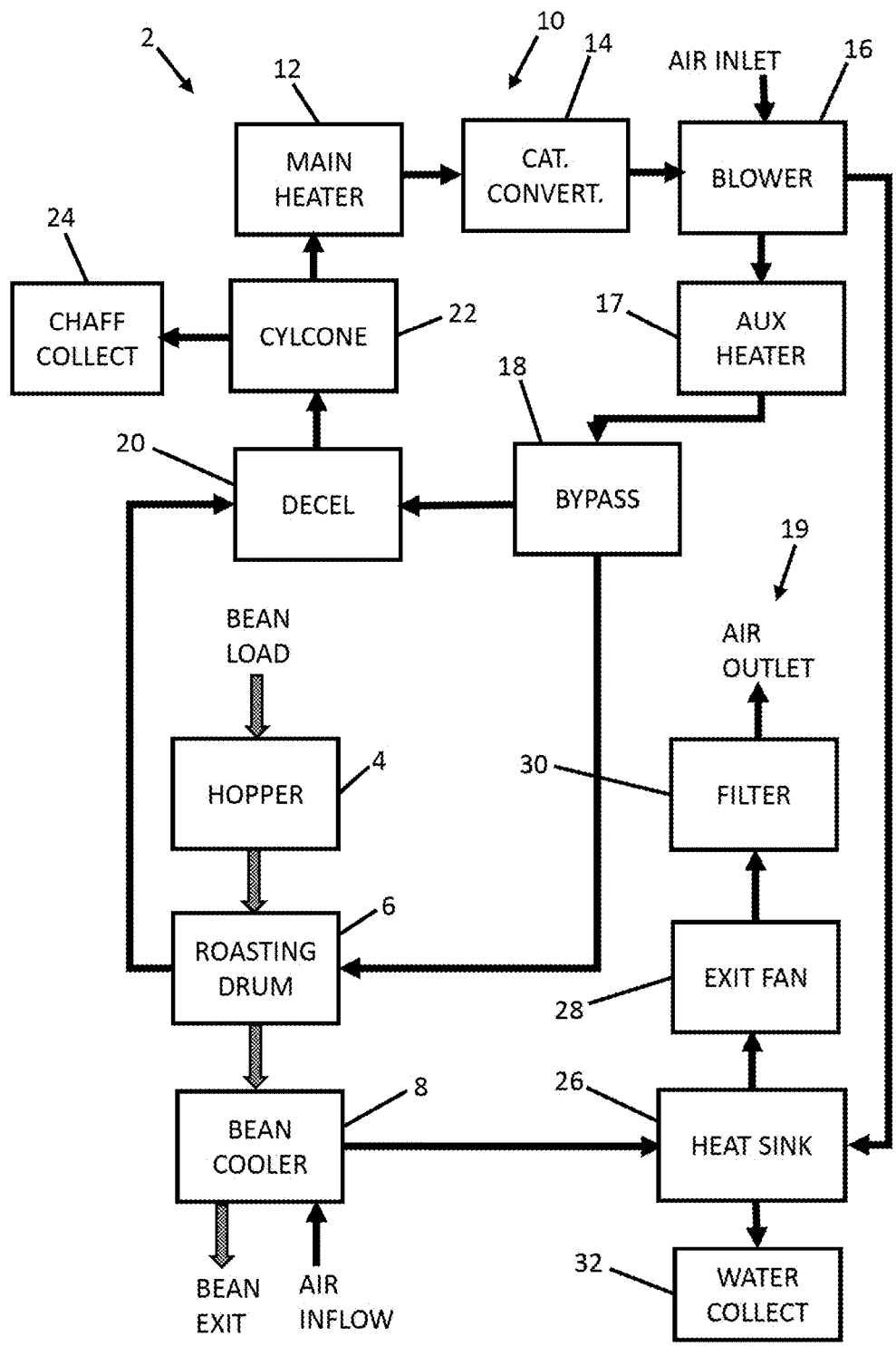
FIG. 1 is a schematic diagram of an embodiment of a roasting system for processing a batch of coffee beans.

In a first aspect of the disclosure, a bean roasting system includes a roasting drum, an air handling system, a bean cooler, and an air exit subsystem. The roasting drum is configured to receive and to thermally roast beans. The air handling system is configured to circulate a fluid stream through the roasting drum. The bean cooler is configured to receive and cool the beans from the roasting drum. The air exit subsystem is configured to receive and treat a first fluid stream from the air handling system and a second fluid stream from the bean cooler. The air exit subsystem includes a heat sink and a filter. The heat sink defines two parallel fluid paths including a first fluid path and a second fluid path. The air exit subsystem includes a metal body configured to receive heat from the first fluid path and the second fluid path. The first fluid path is fluidically coupled to receive the first fluid stream from the air handling system. The second fluid path is fluidically coupled to receive the second fluid stream from the bean cooler. The filter is fluidically coupled to the first and second air flow paths. The bean roasting system can be described with respect to X, Y, and Z axes that are mutually perpendicular. The X-axis and Y-axis are lateral axes that are generally horizontal. The Z-axis is vertical and generally aligned with a gravitational reference.

The function of the air exit subsystem is to remove heat, water vapor, and noxious effluents from the fluid streams including the first fluid stream and the second fluid stream. This design has advantages: (A) The heat is transferred from the fluid streams is transferred to the metal body of the heat sink. Having a single metal body coupled to both parallel fluid paths provides a better heat capacity for each one. This is advantageous because operation is asynchronous: The first fluid stream passes through the heat sink during the operation of roasting a batch of beans. After this, the second fluid stream passes through the heat sink as the batch of beans is being cooled. Thus a larger heat capacity heat sink is leveraged by both fluid streams. (B) Both fluid streams leverage a single filter. This allows for a single larger capacity and more effective filtration for each fluid stream.

In one implementation, the air exit subsystem includes a housing that defines a housing fluid path. The housing fluid path merges the first fluid stream and the second fluid stream to provide a merged fluid stream. The housing fluid path also fluidically couples the merged fluid stream to the filter. The housing includes an exit fan disposed within the housing fluid path. The merged fluid stream generally traverses the housing fluid path along the lateral Y-axis. Next, the merged fluid stream passes downward (−Z) into the filter along the vertical Z-axis. Finally, the merged fluid path passes through filters in the filter along the X-axis.

In another implementation, the air exit subsystem includes a housing. The first fluid stream enters the housing along the Y-axis and then traverses the first fluid path primarily along the Z-axis. The first fluid path directs the first fluid stream in a downward (−Z) direction and then an upward (+Z) direction with respect to the Z-axis before the first fluid stream re-enters the housing.

In yet another implementation, the air exit subsystem includes a housing. The second fluid stream enters the second fluid path upward (+Z) along the Z-axis before entering the housing.

In a further implementation, the heat sink further includes a first plurality of fins extending from the metal body into the first fluid path and a second plurality of fins extending from the metal body into the second fluid path.

In a yet further implementation, the bean roasting system includes a controller. The controller is configured to operate the roasting drum, the air handling system, and the bean cooler. The controller is configured to operate the roasting drum and the air handling system to receive and to thermally roast a batch of beans. The controller is configured to operate the bean cooler to cool the batch of beans. The controller is configured to operate the air exit subsystem to receive and treat the first fluid stream and the second fluid stream. Operating the air exit subsystem includes passing the first fluid stream through the first fluid path, passing the second fluid stream through the second fluid path, and passing the first fluid stream and the second fluid stream to the filter.

DETAILED DESCRIPTION

FIG. 1 is a schematic diagram of an embodiment of a roasting system 2. FIG. 1 discloses fluid paths between various functional elements. The fluid paths tend to conduct gaseous fluids such as air, water vapor, and gaseous emissions from beans being roasted or cooled. In addition, particulates from the roasting process can also be transmitted or entrained through the fluid paths. FIG. 1 also discloses a path for a batch of beans from a bean load to a bean exit.

Roasting system 2 includes a hopper 4 for loading and receiving a quantity or batch of unroasted beans. The hopper 4 feeds the unroasted beans into a roasting drum 6 or roasting drum 6 within which the batch of beans is heated and roasted, for example, according to a pre-programmed roasting process. Adjacent or below the roasting drum 6 is a bean cooling subsystem 8 or bean cooler 8 for receiving the batch of beans when they are in a just-roasted state (still hot), holding the batch of beans until they are cooled, and then dispensing the batch of beans into a receiving container such as a bag (not shown).

The roasting drum 6 is coupled to an air handling system 10 that includes a main heater 12, a catalytic converter 14, a blower 16, an auxiliary heater 17, a bypass 18, a velocity decelerator 20, a cyclone separator 22, and chaff collector 24. The air handling system 10 determines a temperature versus time roasting profile through controlled operation of the main heater 12, blower 16, auxiliary heater 17, bypass 18, and possibly other components of the air handling system 10. An air stream (indicated by arrows) recirculates through the air handling system 10. The air handling system 10 receives and removes particles and gaseous effluents emitted during the roasting process. The particles are captured by the cyclone 22, which deposits them in the chaff collector 24, which is periodically emptied. The gaseous effluents are collected by the catalytic converter 14.

The air handling system 10 defines two different branches or loops of air flow that are coupled by the bypass 18. One branch circulates from the bypass 18 to a decelerator 20, through the cyclone 22, main heater 12, catalytic converter 14, blower 16, and auxiliary heater 17, before returning to the bypass 18. Another branch passes from the bypass 18 to the roasting drum 6, to the decelerator 20, the cyclone 22, main heater 12, catalytic converter 14, blower 16, and auxiliary heater 17, before returning to bypass 18.

Part of an airstream generated by the blower 16 passes through an air exit subsystem 19 including a heat sink 26, an exit fan 28, and a filter 30 before being passed to environmental air (labeled as "air outlet" in FIG. 1). The heat sink 26 has the effect of condensing water vapor from the exit airstream as well as cooling the exit airstream. The condensed water vapor drips into a water collection receptacle 32. Replacement air (labeled "air inlet" in FIG. 1) from the environment air enters the blower 16. The overall effect is to remove water vapor from the air handling system 10 and to condense the water into the water collection receptacle 26.

The bean cooler 8 is also coupled to the air exit subsystem 19. The exit fan 28 therefore draws air out of the bean cooler 8 through the heat sink 26. This has the effect of accelerating cooling of the batch of beans.

Figure 2:
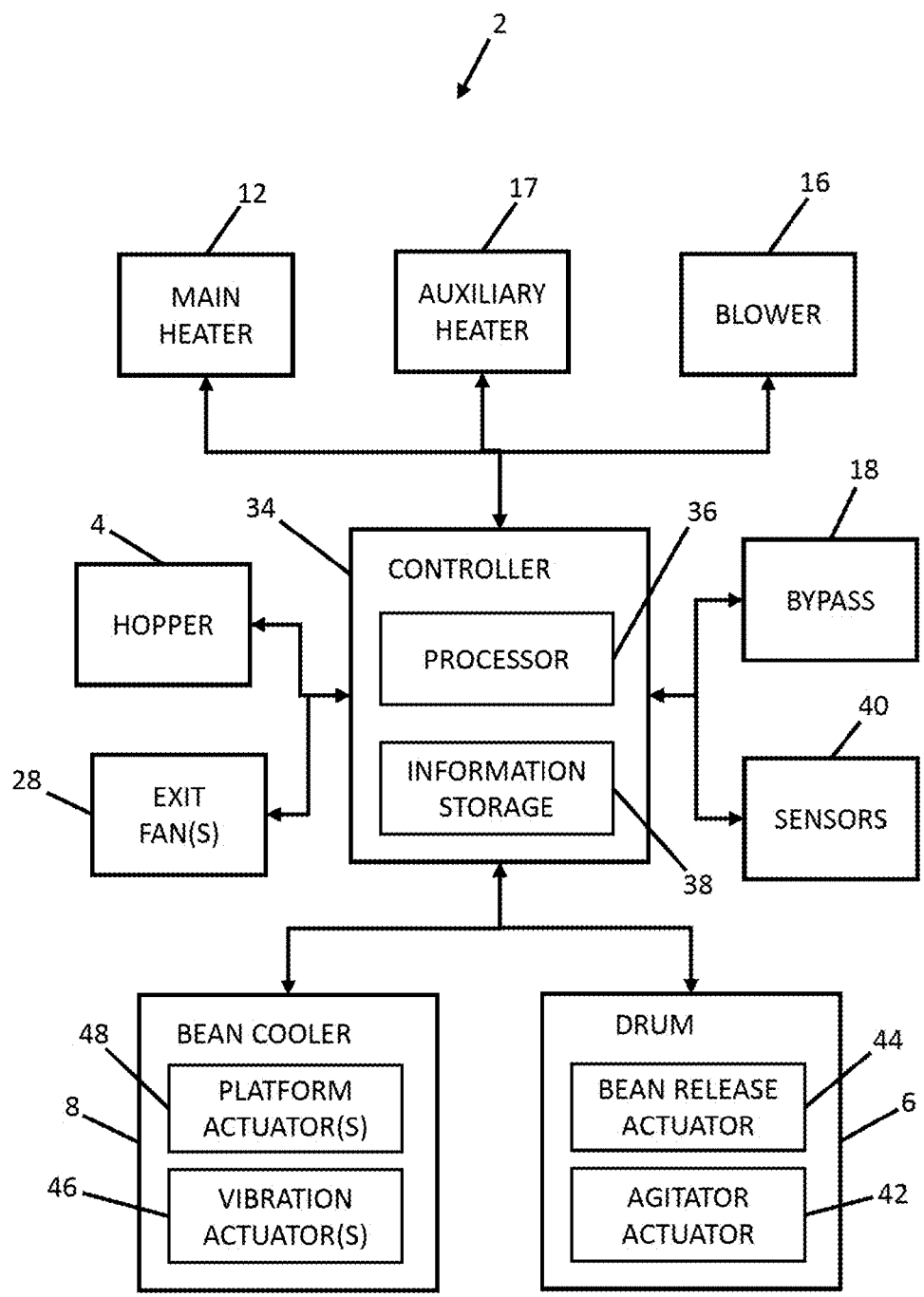
FIG. 2 is a simplified electrical block diagram for the roasting system of FIG. 1.

FIG. 2 is a simplified electrical block diagram of the roasting system 2. Relative to FIG. 1, like element numbers refer to like components. However, whereas FIG. 1 focuses on fluidics and the physical motion of beans, FIG. 2 focuses on electrical or wireless connections between components.

A controller 34 includes a processor 36 coupled to an information storage device 38. The information storage device 38 is a non-volatile or non-transient information storage device 38 that stores software instructions. When executed by the processor 36, the software instructions can control portions of the roasting system 2 that the controller 34 is configured to control. For example, the controller 34 can control any of the hopper 4, drum 6, bean cooler 8, main heater 12, blower 16, auxiliary heater 17, bypass 18, exit fan(s) 28, and other portions of the roasting system 2. The controller 34 can receive information form one or more sensors 40 for monitoring a status of portions of roasting system 2. The controller 34 is configured to control various actuators including an agitator actuator 42, a bean release actuator 44, a vibration actuator 46, and a platform actuator 48.

The agitator actuator 42 is configured to agitate the batch of beans within the drum 6 during the roasting process. The bean release actuator 44 is configured to release the batch of beans after roasting so that they can enter the bean cooler 8. The vibration actuator 46 is configured to vibrate the batch of beans and to enhance uniformity and rate of cooling of the batch of beans. The platform actuator 48 is configured to release the batch of beans after cooling to be dispensed into a container or bag.

In an embodiment, the agitator actuator 42 is configured to rotate an agitator. The agitator can include an agitator blade set supported by a central shaft. The agitator actuator can include a motor and a power coupling that couples the motor to the central shaft. The power coupling can include a gearbox and/or a belt that provides rotative coupling between the motor and the central shaft. In an embodiment, the bean release actuator 44 includes a pneumatic cylinder configured to open and close a hatch formed into a lower surface of the drum 6.

In an embodiment, the vibration actuator 46 can include a motor coupled to an elliptical cam or gear that couples to and shakes a cooling platform, which in turn supports a batch of beans while cooling. In other embodiments the vibration actuator 46 can take other forms such as a motor with an elliptical weight or a piezoelectric transducer stack. In an embodiment, the platform actuator 48 can include one or more pneumatic cylinders configured to open and close an opening in the cooling platform.

Figure 3:
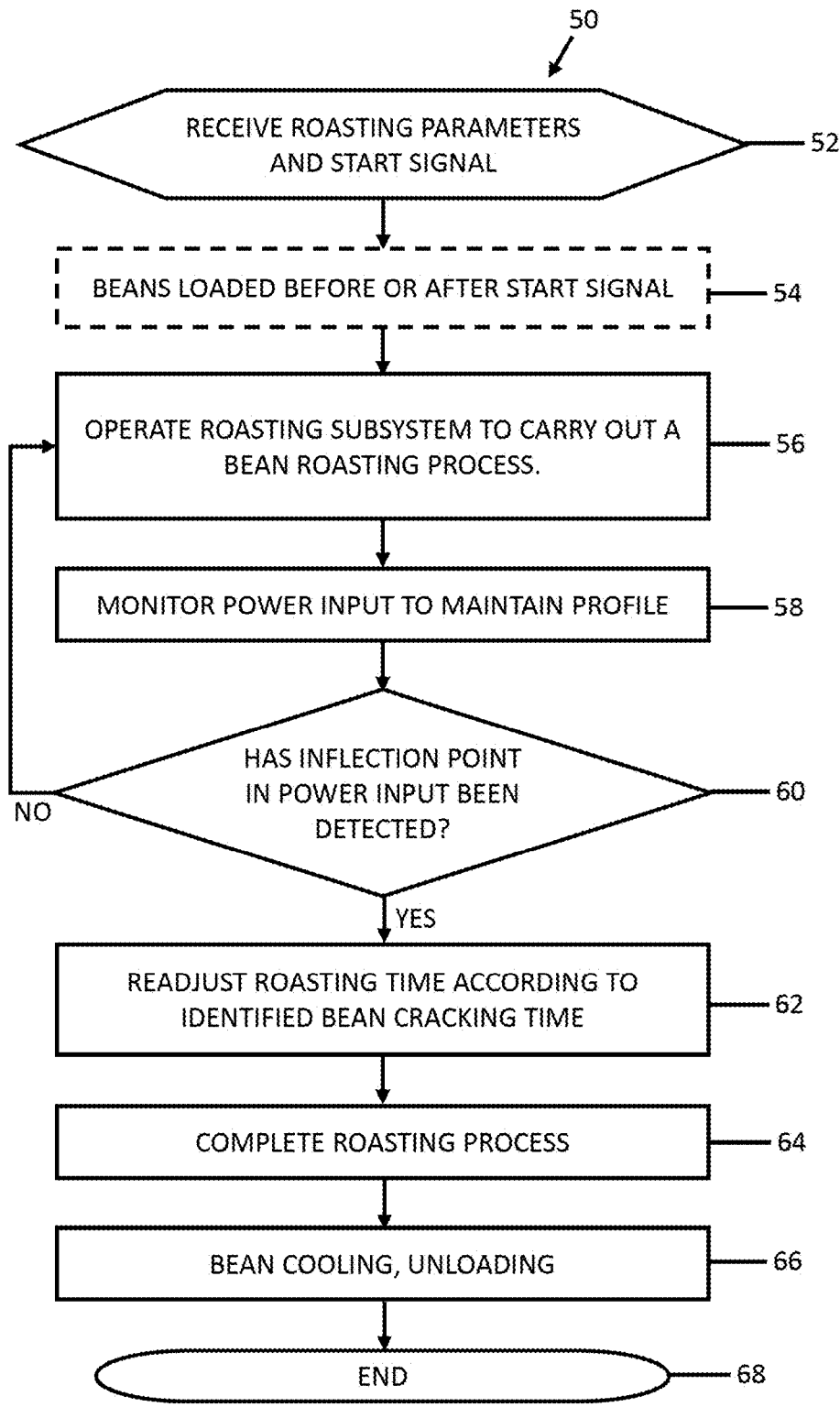
FIG. 3 is a flowchart of an embodiment of a roasting process for a batch of beans.

FIG. 3 is a flowchart of an embodiment of a roasting process 50 that is controlled by the controller 34. According to 52, controller 34 receives roasting parameters and a start signal. The roasting parameters can be indicative of a temperature-versus-time profile for roasting. The roasting parameters may also include a temperature profile before and after a bean cracking event is detected.

According to 54, a batch of beans is automatically or manually loaded into the hopper 4. Step 54 is showed in a dashed outline to highlight that it can be performed before or after step 52.

According to step 56, the roasting system 10 is operated to agitate and heat the batch of beans to begin and executing a bean roasting process. Executing the roasting process includes more particular processes including (1) operating the hopper to release the batch of beans into the drum, (2) operating the agitator actuator 42 to begin stirring and agitating the batch of beans, and (3) operating the air handling system 10 to heat the drum and to remove byproducts of the roasting process. The temperature in the drum ramps up and then stabilizes at a roasting temperature.

According to 58, a power used by the air handling system 10 to maintain the roasting temperature (by heating the drum) is monitored. The power is used to compensate for heat losses from the air handling system as well as a phase change that occurs as water is released from the batch of beans. The power usage will tend to be fairly stable and to drop during roasting initially. However, when the beans begin cracking, an exposure of water from within the beans will result in the air handling system 10 using more power to compensate for a phase change in the water from liquid to gaseous phase. The controller will then detect an increase in the power input in step 58. This increase in power is referred to as an "inflection point" in the monitored power level.

According to 60, detection of the inflection point in power level causes the process to proceed to step 62. Otherwise, the process loops back to steps 56 and 58 to continue to maintain the roasting temperature and monitor the input power.

Once the inflection point is determined, the controller 34 computes or determines a remaining temperature profile (temperature versus time) to complete the roasting process according to step 62. According to step 64, the controller applies the determined remaining temperature profile to the batch of beans.

According to 66, the controller controls the drum 6 and bean cooler 8 to cool and release the batch of beans. This ends at step 68 with the beans released into a container such as a bag.

Figure 4:
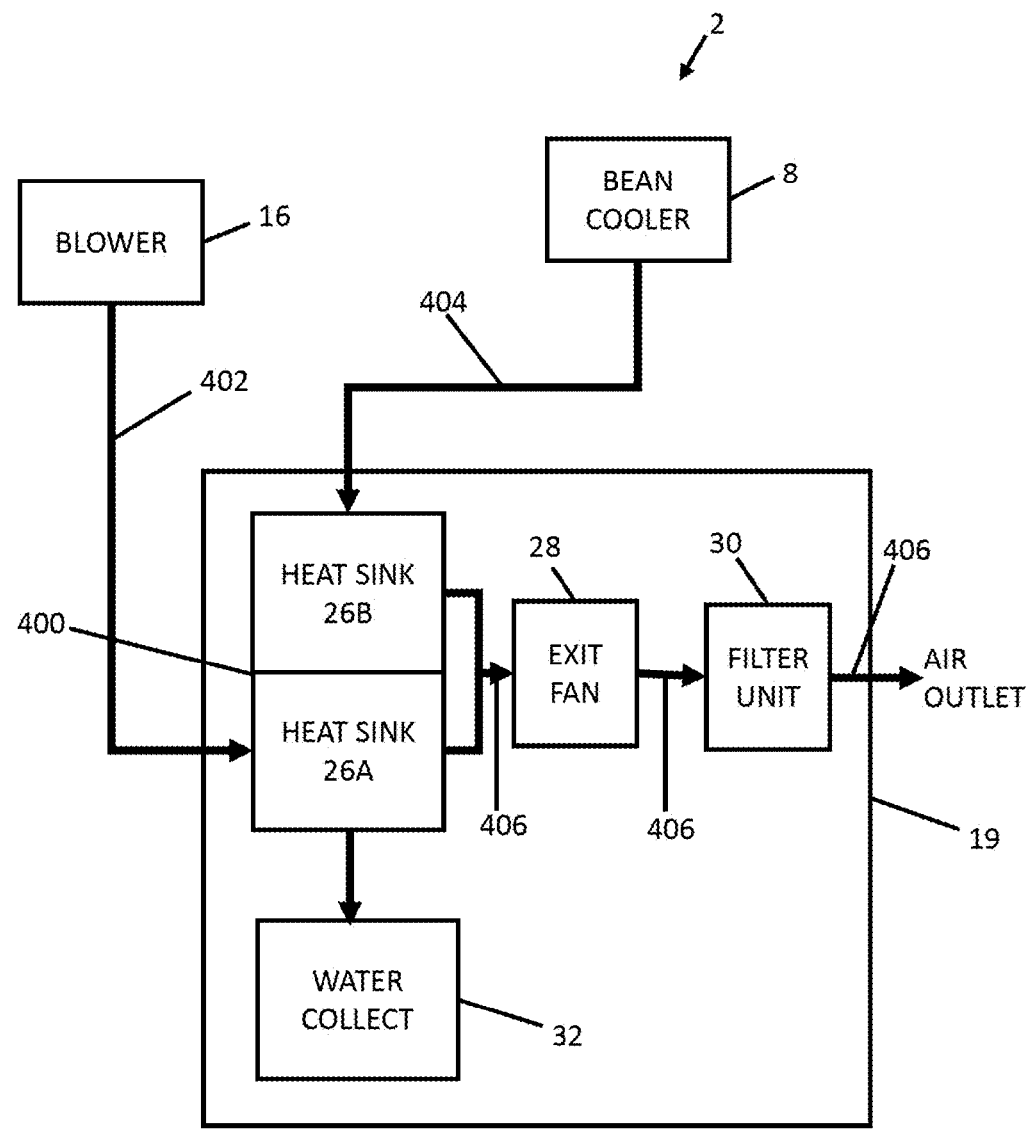
FIG. 4 is a schematic diagram of a portion of a roasting system to put emphasis on an embodiment of an air exit subsystem. The air exit subsystem has a purpose of removing heat, water vapor, and noxious effluents arising during a roasting and cooling process.

FIG. 4 is a schematic diagram of a portion of the roasting system 2 to put emphasis on an embodiment of the air exit subsystem 19. It is to be understood that the roasting system 2 includes additional components illustrated in FIGS. 1 and 2, which are left out of FIG. 4 for simplicity.

Illustrated in FIG. 4 are two fluid streams including first fluid stream 402 and second fluid stream 404. In referring to a "fluid stream" it is primarily a gaseous air stream that can be laden various gaseous, vaporous, and/or small particulate components. The first fluid stream 402 comes from the air handling system 10, which circulates a fluid stream through the roasting drum 6. This first fluid stream 402 is extremely hot and laden with water vapor, particulates, and noxious gaseous effluents. A need exists to effectively and efficiently cool the first fluid stream 402 and to remove the gaseous, vaporous, and/or small particulate components. In the illustrated embodiment, the first fluid stream 402 leaves the output of the blower 16 before arriving at the air exit subsystem 19. The second fluid stream 404 is also very hot upon arrival from the cooling subsystem (bean cooler) 8.

The heat sink 26 is illustrated in FIG. 4 as having two heat sink portions including first heat sink portion 26A and second heat sink portion 26B. The two heat sink portions 26A and 26B are conductively thermally coupled to each other as one common connected metal body 400. The first heat sink portion 26A receives the first fluid stream 402 from the blower 16. The second heat sink portion 26B receives the second fluid stream 404 from the cooling subsystem (bean cooler) 8. The second heat sink portion 26B is operatively coupled to water collection receptacle 32 (e.g., a container or a bottle for receiving water from the second heat sink portion 26B).

The first fluid stream 402 and the second fluid stream 404 merge to form a merged fluid stream 406. The exit fan 28 receives and pushes the merged fluid stream 406 through the filter 30 before the merged fluid stream 406 exits into a surrounding environment ("AIR OUTLET").

FIGS. 5-9 illustrate an embodiment of the exit air subsystem 19. In the foregoing illustrations the mutually orthogonal (perpendicular) axes X, Y, and Z are used. The X-axis and Y-axis are lateral axes that are generally (or substantially) horizontal. The Z-axis is a vertical axis and is generally aligned with a gravitational reference. By "generally" (or "substantially") it is meant that this is by design to within manufacturing tolerances but may not be exact. In addition, all references to the X, Y, and Z directions are understood to be generally (or substantially) in such directions and some variation is permitted as appropriate for the situation. For example, when discussing the direction of fluid steam, it should be understood that the fluid steam may not pass exactly in the discussed directions but could vary due to pressure differences and/or temperature differences, etc.

Figure 5:
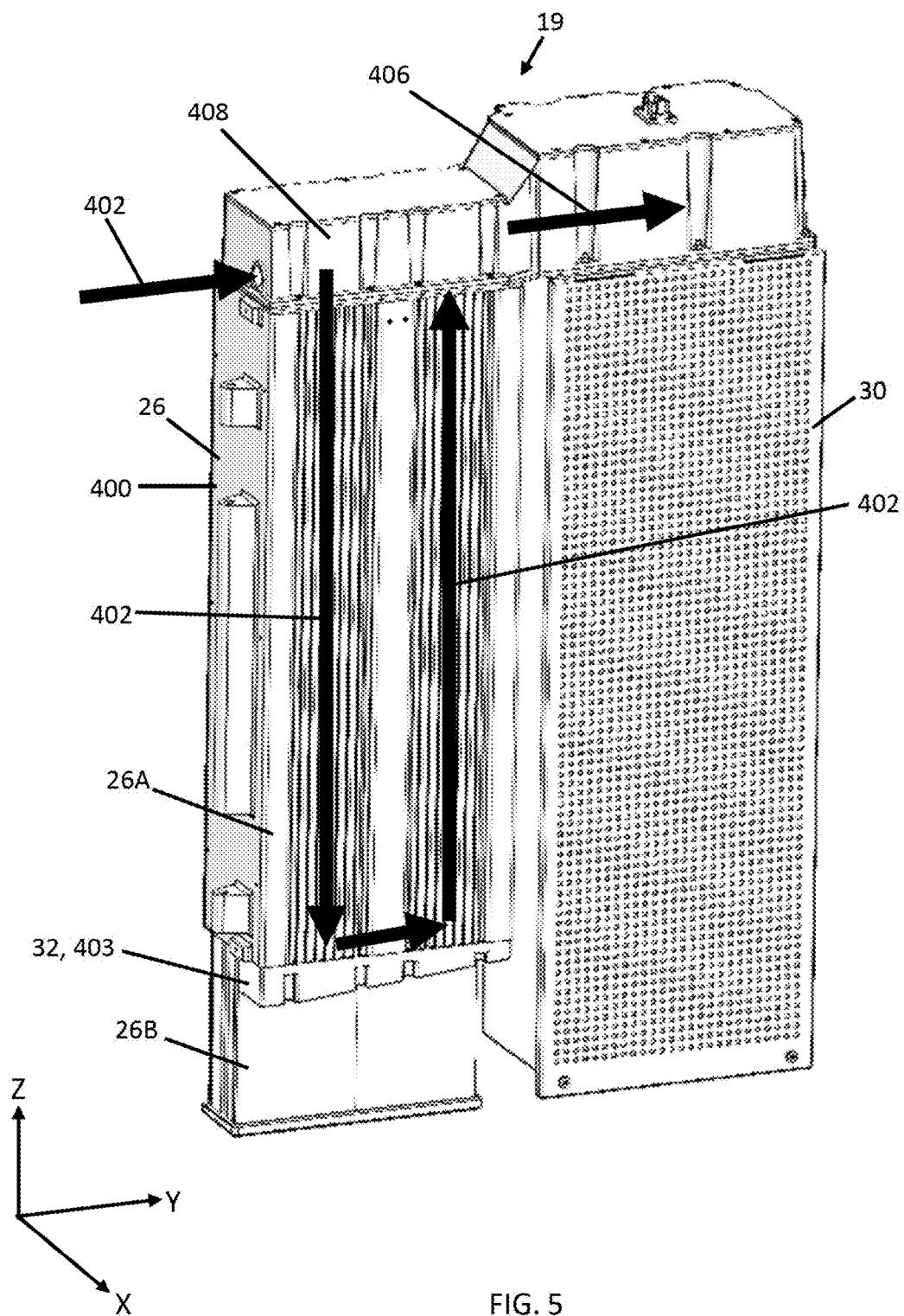
FIG. 5 is a "front side" isometric drawing illustrating an embodiment of a heat sink coupled to a filter.

FIG. 5 is an isometric drawing illustrating the heat sink 26 coupled to the filter 30 by a housing 408. From the perspective of FIG. 5, the first heat sink portion 26A is facing a viewer. Also illustrated is a path of the first fluid stream 402. First fluid stream 402 enters the housing 408 along the Y-axis in the +Y direction. The first fluid stream 402 then passes a first time through the first heat sink portion 26A in a downward -Z direction along the Z-axis. Then the first fluid stream 402 passes a second time through the first heat sink portion 26A in an upward +Z direction along the Z-axis. Having the first fluid stream 402 pass through the first heat sink portion 26A two times maximizes (or improves) heat transfer from the first fluid stream 402 to the heat sink 26. In alternative embodiments, the first fluid stream 402 can pass through the first heat sink portion 26A more than two times. A water collection trough 403 is coupled to a lower end of the first heat sink portion 26A. Water collection trough 403 forms at least a part of the water collection receptacle 32 (that can include a bottle (not shown) for receiving water from the water collection trough 403). As the first fluid stream 402 passes through the heat sink portion 26A it cools and the carried water vapor condenses onto surfaces of the heat sink portion 26A and then flows down into the collection trough 403.

Figure 6:
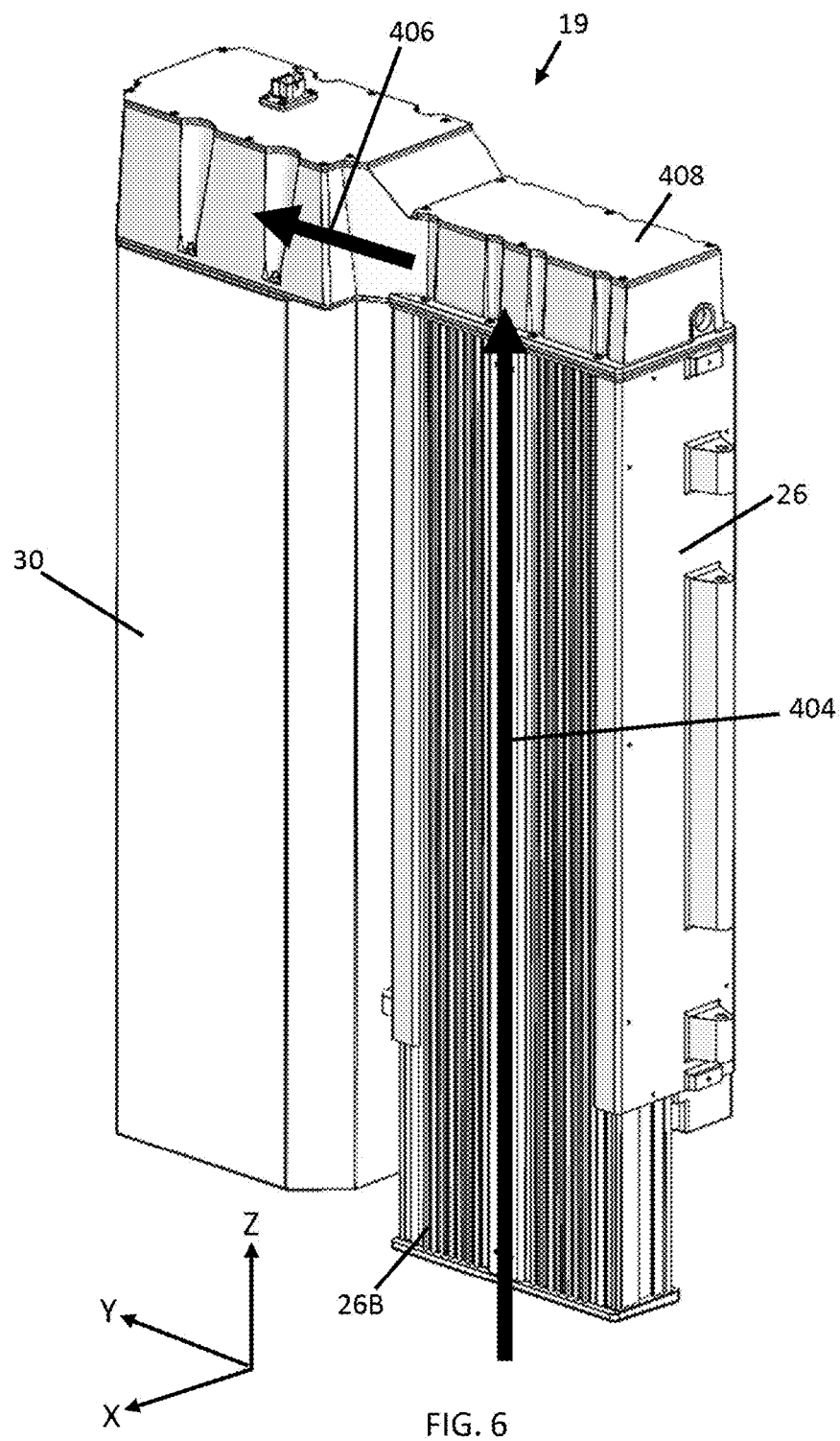
FIG. 6 is a "back side" isometric drawing illustrating an embodiment of a heat sink coupled to a filter.

FIG. 6 is an isometric drawing illustrating the heat sink 26 coupled to the filter 30 from the perspective of second heat sink portion 26B facing a viewer. The second fluid stream 404 passes through the second heat sink portion 26B in an upward +Z direction along the Z-axis until it reaches the housing 408. In alternative embodiments, the second fluid stream passes through the heat sink portion 26B more two or more times. Then the first fluid stream passes laterally in a +Y direction until it merges with the first fluid stream 402, which results in the merged fluid stream 406.

Figure 7:
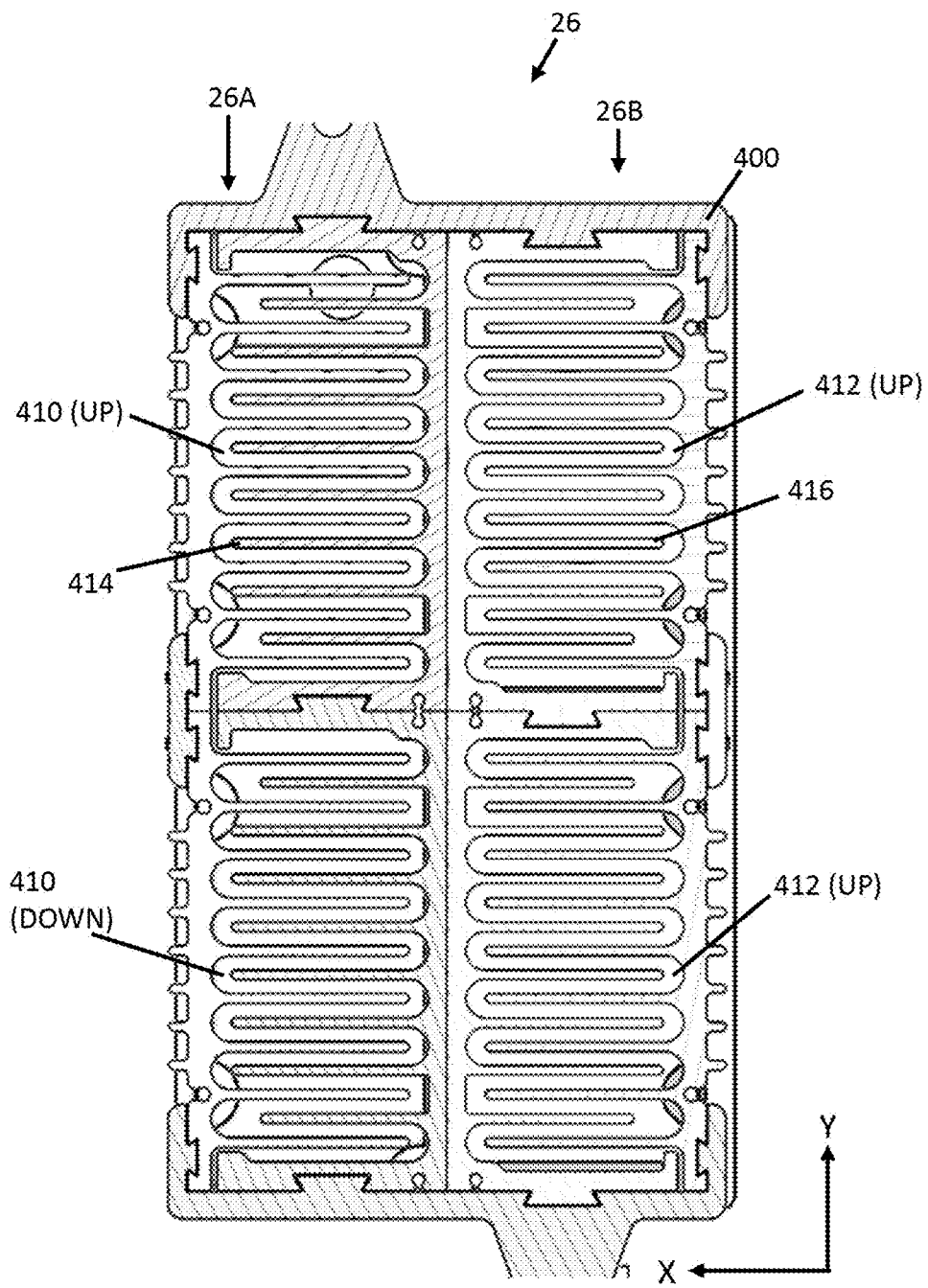
FIG. 7 is a horizontal cross-sectional view of a heat sink.

FIG. 7 is a horizontal cross-sectional view of the heat sink 26. More specifically, FIG. 7 is a cross-sectional view taken from a horizontal plane cut through the heat sink 26 shown in FIGS. 5 and 6, and looking down (in the −Z direction). Heat sink 26 defines two internal and "parallel" fluid paths including a first fluid path 410 and a second fluid path 412. The two internal fluid paths (410 and 412) are referred to as "parallel" because fluid streams 402 and 404 mostly flow along the Z-axis as they pass through the heat sink 26. More specifically, the fluid stream 402 (shown in FIG. 5) can travel along the internal fluid path 410 (shown in FIG. 7), which is down in a −Z direction into the page (shown in the left bottom quadrant in FIG. 7) and then up in a +Z direction out of the page (shown in the left upper quadrant in FIG. 7). Similarly, the fluid stream 404 (shown in FIG. 6) can travel along the internal fluid path 412 (shown in FIG. 7), which is up in a +Z direction out of the page (shown in the right upper and right bottom quadrants in FIG. 7).

As is also illustrated in FIG. 5, the first fluid stream 402 first flows up and then down through the internal fluid path 410. As is also illustrated in FIG. 6, the second fluid stream 404 flows up through the second fluid path 412. Returning to FIG. 7, heat sink 26 includes a first plurality of fins 414, which extend from the metal body 400 and into the first fluid path 410. Heat sink 26 includes a second plurality of fins 416, which extend from the metal body 400 and into the second fluid path 412. As indicated the "DOWN/UP" first fluid path 410 is defined within the first heat sink portion 26A. The "UP" second fluid path 412 is defined within the second heat sink portion 26B.

In the illustrated embodiment, the metal body 400 and fins 414 and 416 are monolithically formed from cast aluminum. This provides a very high conductive heat transfer from the fins to the metal body 400. The metal body 400 being common to both sets of fins 414 and 416 provides a large heat sink capacity for removing heat from the fluid streams 402 and 404. In other implementations, the metal body 400 and fins 414 and 416 can be formed by techniques other than being monolithically formed (e.g., portions formed separately and then connected together), and from materials other than cast aluminum (e.g., aluminum, steel, cast iron, etc.).

In the illustrated embodiment, the fluid path 410 has the DOWN and UP segments that have a vertical extent of 33 inches or a total of 66 inches counting the DOWN and UP segment sequence. This provides a considerable structural length exposure to maximize (or improve) heat transfer. In the illustrated embodiment, the UP fluid path 412 has a vertical extent of 42 inches. It is typically desirable to maximize (or improve) heat transfer from the fluid streams 410 and 412 because the bean roasting system 2 may be located, for example, in a small facility such as a coffee shop facility. This will transfer most of the heat to the metal body 400 and not to the local atmosphere so as not to overwhelm air conditioning of the facility as the merged fluid stream 406 is output. The cooling also helps improve a life of replaceable components in the filter 30.

Figure 8:
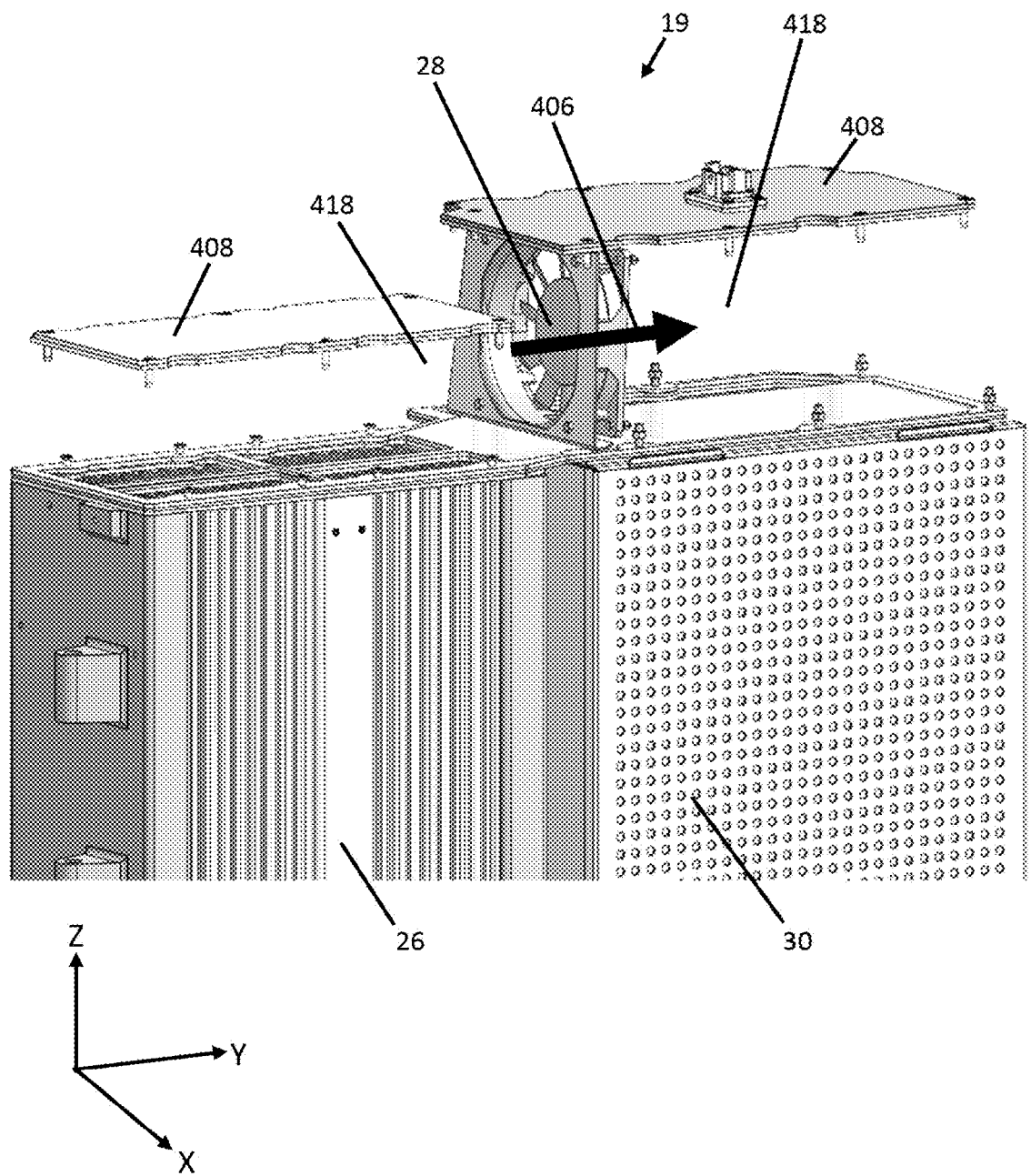
FIG. 8 is an isometric view of an upper portion of the air exit subsystem with emphasis on a housing that provides fluidic coupling to and between a heat sink and filter.

FIG. 8 is an isometric view of an upper portion of the air exit subsystem 19 with emphasis on a portion of the housing 408. Housing 408 defines a housing fluid path 418 through which the fluid streams 402, 404, and 406 flow. The housing fluid path 418 merges the first fluid stream 402 and the second fluid stream 404 to provide the merged fluid stream 406. The housing 408 includes the exit fan 28. The merged fluid stream 406 flows along the Y-axis and then into the filter 30.

Figure 9:
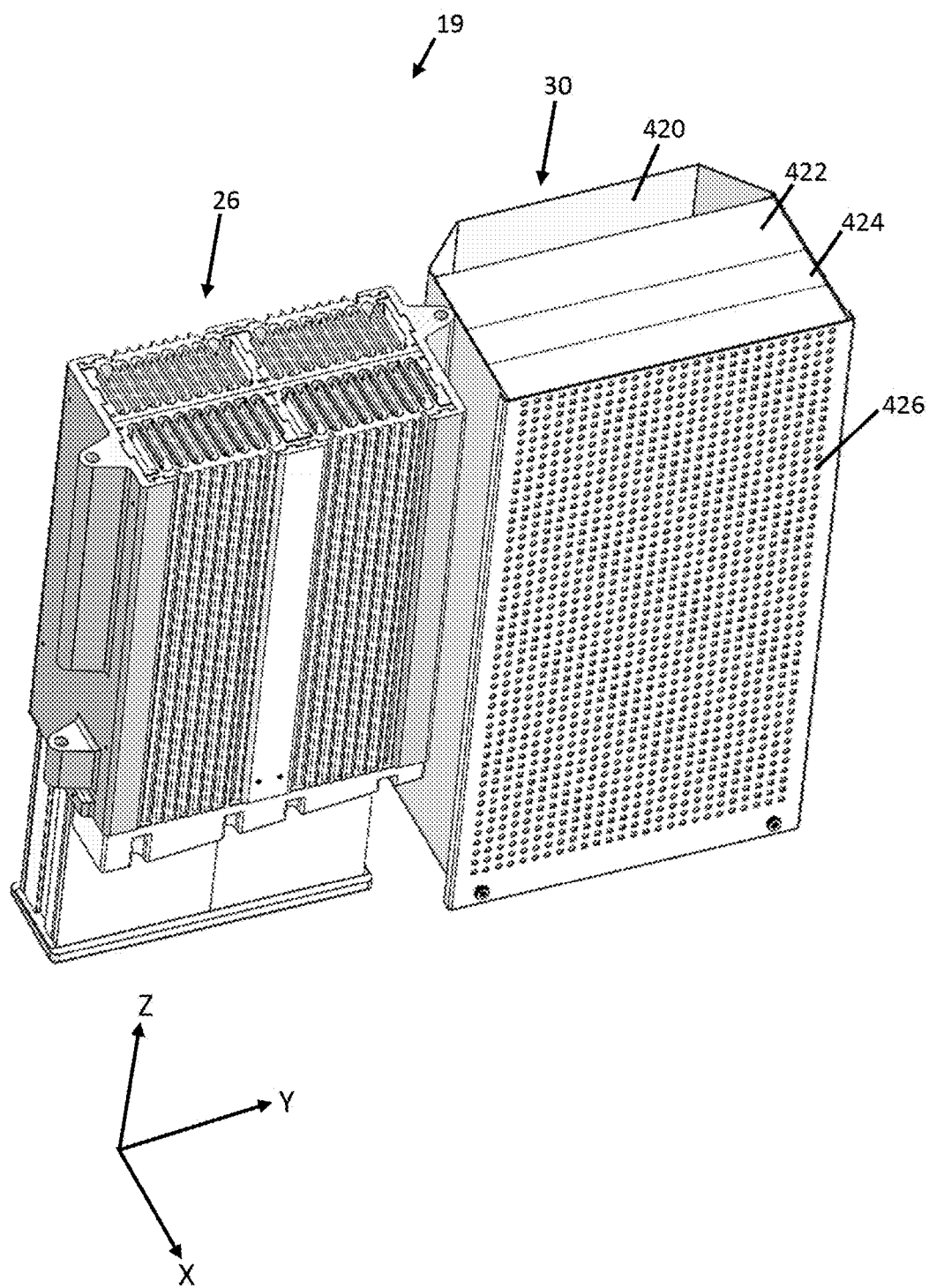
FIG. 9 is an isometric cutaway view looking down on an embodiment of an air exit subsystem.

FIG. 9 is an isometric cutaway view looking down upon the air exit subsystem 19. The filter 30 includes an input fluid path 420, a high efficiency particular air (HEPA) filter 422, a carbon treatment filter 424, and exit openings 426. Being driven by the exit fan 28, the merged fluid stream 408 flows downward (−Z) along the Z axis into and along the input fluid path 420 and then laterally in the +X direction along the X-axis through the HEPA filter 422, the carbon treatment (activated charcoal) filter 424, and out the exit openings 426.

The specific embodiments and applications thereof described above are for illustrative purposes only and do not preclude modifications and variations encompassed by the scope of the following claims.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules (e.g., a controller) may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" (or "information storage") should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

What is claimed:

1. A bean roasting system, comprising:
a roasting drum configured to receive and to thermally roast beans;
a blower configured to circulate a first fluid stream through the roasting drum;
a bean cooler configured to receive and cool the beans from the roasting drum; and
an air exit subsystem configured to receive and treat the first fluid stream from the blower and a second fluid stream from the bean cooler, the air exit subsystem including:
a heat sink defining a first fluid path and a second fluid path substantially parallel to the first fluid path and including a metal body;
the metal body configured to receive heat from the first fluid path and the second fluid path;
the first fluid path fluidically coupled to the blower to receive
the first fluid stream from the blower;
the second fluid path fluidically coupled to the bean cooler to receive the second fluid stream from the bean cooler; and
a filter fluidically coupled to the first fluid path and the second fluid path.

2. The bean roasting system of claim 1, further comprising a housing defining a housing fluid path that fluidically couples the first fluid path and the second fluid path to the filter and merges the first fluid stream and the second fluid stream to provide a merged fluid stream.

3. The bean roasting system of claim 2, wherein the housing includes an exit fan disposed within the housing fluid path.

4. The bean roasting system of claim 3, wherein, during operation, the merged fluid stream generally traverses the housing fluid path along a lateral Y-axis, then passes into the filter along a vertical Z-axis, and then passes through filters in the filter along a lateral X-axis, the X-axis, the Y-axis, and the Z-axis are mutually orthogonal.

5. The bean roasting system of claim 2, wherein, during operation, the first fluid stream enters the housing along a Y-axis and then traverses along the first fluid path along a Z-axis, the Y-axis and the Z-axis are mutually orthogonal.

6. The bean roasting system of claim 1, wherein, during operation, the first fluid path and the second fluid path direct the first fluid stream and the second fluid stream, respectively, along a vertical Z-axis.

7. The bean roasting system of claim 6, wherein, during operation, the first fluid path first directs the first fluid stream in a downward direction and then in an upward direction along the Z-axis.

8. The bean roasting system of claim 7, wherein, during operation, the first fluid stream enters the air exit subsystem along a lateral Y-axis before entering the first fluid path, the lateral Y-axis is orthogonal to the vertical Z-axis.

9. The bean roasting system of claim 6, wherein, during operation, the second fluid path directs the second fluid stream in an upward direction along the vertical Z-axis.

10. The bean roasting system of claim 1, wherein the first fluid stream traverses from the blower to the first fluid path during operation.

11. The bean roasting system of claim 1, wherein the heat sink further includes:
a first plurality of fins extending from the metal body into the first fluid path; and
a second plurality of fins extending from the metal body into the second fluid path.

12. The bean roasting system of claim 1, further comprising a controller configured to operate the roasting drum, the blower, and the bean cooler.

13. A method of roasting a batch of beans via the bean roasting system of claim 1, comprising:
thermally roasting the batch of beans via the bean roasting system, the thermally roasting including operating the roasting drum and the blower to receive and to thermally roast the batch of beans; and
operating the air exit subsystem to receive and treat the first fluid stream and the second fluid stream, operating the air exit subsystem including:
passing the first fluid stream through the first fluid path;
passing the second fluid stream through the second fluid path; and
passing the first fluid stream and the second fluid stream to the filter.

14. The method of claim 13, wherein the air exit subsystem includes a housing defining a housing fluid path and contains an exit fan, the method further comprising:
    operating the exit fan;
    merging the first fluid stream and the second fluid stream into a merged fluid stream within the housing fluid path; and
    passing the merged fluid stream to the filter.

15. The method of claim 13, wherein the air exit subsystem includes a housing, the method further comprising:
    receiving the first fluid stream into the housing along a Y-axis; and
    passing, after the receiving the first fluid stream into the housing, the first fluid stream from the housing and through the first fluid path along a Z-axis.

16. The method of claim 13, wherein:
    the first fluid path primarily extends along a vertical Z-axis, and
    the passing the first fluid stream through the first fluid path includes passing the first fluid stream along the Z-axis in a downward direction and then passing the first fluid stream along the Z-axis in an upward direction.

17. The method of claim 13, wherein:
    the second fluid path primarily extends along a vertical Z-axis, and
    the passing the second fluid stream through the second fluid path includes passing the second fluid stream along the Z-axis in an upward direction.

18. The method of claim 13, wherein the heat sink includes a plurality of fins extending from the metal body into the first fluid path, the method further comprising:
    convectively transferring heat from the first fluid stream into the plurality of fins and conductively transferring heat from the plurality of fins to the metal body.

19. The method of claim 13, wherein the heat sink includes a plurality of fins extending from the metal body into the second fluid path, the method further comprising:
    convectively transferring heat from the second fluid stream into the plurality of fins and conductively transferring heat from the plurality of fins to the metal body.

20. A bean roasting system, comprising:
    a hopper;
    a roasting drum;
    a blower;
    a bean cooler;
    an air exit subsystem configured to receive and treat a first fluid stream from the blower and a second fluid stream from the bean cooler, the air exit subsystem including:
        a heat sink defining two parallel fluid paths including a first fluid path and a second fluid path and including:
            a metal body;
            a first plurality of fins extending from the metal body into the first fluid path; and
            a second plurality of fins extending from the metal body into the second fluid path;
            the metal body configured to receive heat from the first fluid path and the second fluid path;
            the first fluid path fluidically coupled to receive the first fluid stream from the blower;
            the second fluid path fluidically coupled to receive the second fluid stream from the bean cooler;
    a filter fluidically coupled to the first fluid path and the second fluid path; and
    a controller configured to:
        operate the hopper to transfer a batch of beans to the roasting drum;
        operate the roasting drum and the blower to roast the batch of beans;
        operate the bean cooler to receive and cool the batch of beans; and
        operate the air exit subsystem to:
            treat the first fluid stream to extract heat, water vapor, and effluents; and
            treat the second fluid stream to extract heat and effluents.

* * * * *